Nov. 5, 1963

L. N. LEA 3,109,655

ONE-POINT CONTROL SELECTIVE PHONOGRAPH APPARATUS

Filed Feb. 7, 1962

INVENTOR,
LAWRENCE N. LEA,
BY
ATTORNEY 3,109,655
Patented Nov. 5, 1963

1

3,109,655

ONE-POINT CONTROL SELECTIVE PHONOGRAPH APPARATUS

Lawrence N. Lea, 1683 University Ave., New York, N.Y.
Filed Feb. 7, 1962, Ser. No. 171,653
13 Claims. (Cl. 274—9)

The present invention relates to phonograph apparatus driven by an electric motor and contemplates the use of a revolving record which has successive lanes of sound track whose subject matter musically and/or intellectually, may all be of one topic or on different topics respectively.

An object of this invention is to provide a novel and improved electrically-driven and electrically-controlled phonograph apparatus of the character mentioned, which is adapted to play. one lane at a time and stop at the end of each lane, for it requires that an element be moved to commence the playing of each lane respectively.

Another object thereof is to provide a selector means to chose the lane to be played, which may be any lane on the record.

A further object of this invention is to provide a novel and improved electrically-driven phonograph apparatus of the kind described, in which only a single element need be manipulated to choose the lane to be played, to lift the stylus off the record and bring it to the beginning of the lane chosen and to commence the playing of such lane.

Still another object of this invention is to provide an electrically-driven one-point control phonograph apparatus of the character set forth and having the mentioned attributes, which is simple in construction, easy to understand, simple to use and positive in carrying out the purposes and functions for which it is designed.

Other objects and advantages will become apparent as this disclosure proceeds.

For the practice of this invention, one form it may assume is to have an electric motor arranged to rotate a phonograph record having successive sound track lanes as heretofore mentioned. A pick-up arm is pivotally mounted so that its associated stylus can traverse the record; such arm being resilient so that the stylus bears with sufficient pressure against the record in a sound groove and said arm can be flexed so that the stylus is off the record. Said pick-up arm has a laterally extending finger adapted for wiping connection with any one of a series of spaced contact elements mounted on the frame; such contact elements being electrically connected, but insulated from the frame, so that with said finger, a switch means is created to control the motor circuit. The frame may be comprised of two plates held apart by spacers, so that between such plates, the motor is mounted and dry cells held.

Said finger is of rigid material and extends from near the pivotal axis of the pick-up arm. An elongated pin extends through the frame plates and is laterally slidable along aligned slots, one such slot being in each plate. This relatively long pin is also capable of longitudinal movement, but it is held against any rotary movement about its axis and is maintained in perpendicular relation to the frame plates. A rather short pin extends laterally from said long pin, and is adapted to be engaged in any one of a series of notches in a selector plate, upon movement of said long pin along its track slots. The spacing of the contact elements of the switch means and the spacing of said notches in the selector plate are related to the spacing of the starting points of the lanes of the record.

The said long pin is spring-biased to keep its associated short pin in engagement with the notch it is in the selector plate. Said long pin carries a cam member fixed thereto, positioned normally on the frame plate adjacent the mentioned finger and between said plate and finger, so that upon longitudinal shift of said long pin whereupon the short pin leaves the notch in the selector plate, said cam will engage said finger and lift it off the contact element and of course will also lift the pick-up arm off the record, by means of an arm extending from said cam. This last mentioned arm extends between the pick-up arm and the record, from a post on the cam. The long pin extends through the cam, and with said post a sort of clevis is formed, through which said finger extends.

As the long pin is moved along its track slots upon release of said short pin from the selector plate, the finger and hence the pick-up arm will be moved because of its contact with the tines of said clevis form. Now upon release of said long pin so that its short pin engage a chosen notch in the selector plate, the stylus will be positioned at the start of the lane chosen and said finger will be brought into contact with the switch contact segment related to such chosen lane and the motor will run only until the chosen lane is played.

It is evident that the entire manipulation is accomplished by manual movement of said long pin, which may be deemed the one-point control member for the device. However, in the embodiment illustrated, I have indicated that you can include a simple addition which permits by the turning of a single knob and its depression, the required movements of said long pin member.

I will now give a more detailed description of the invention, a preferred form of which is shown in the accompanying drawing which is part of this specification and in which drawing, similar characters of reference indicate corresponding parts in all the views.

Figures 1, 2, 3, 4, 5, 6, 7, 8:
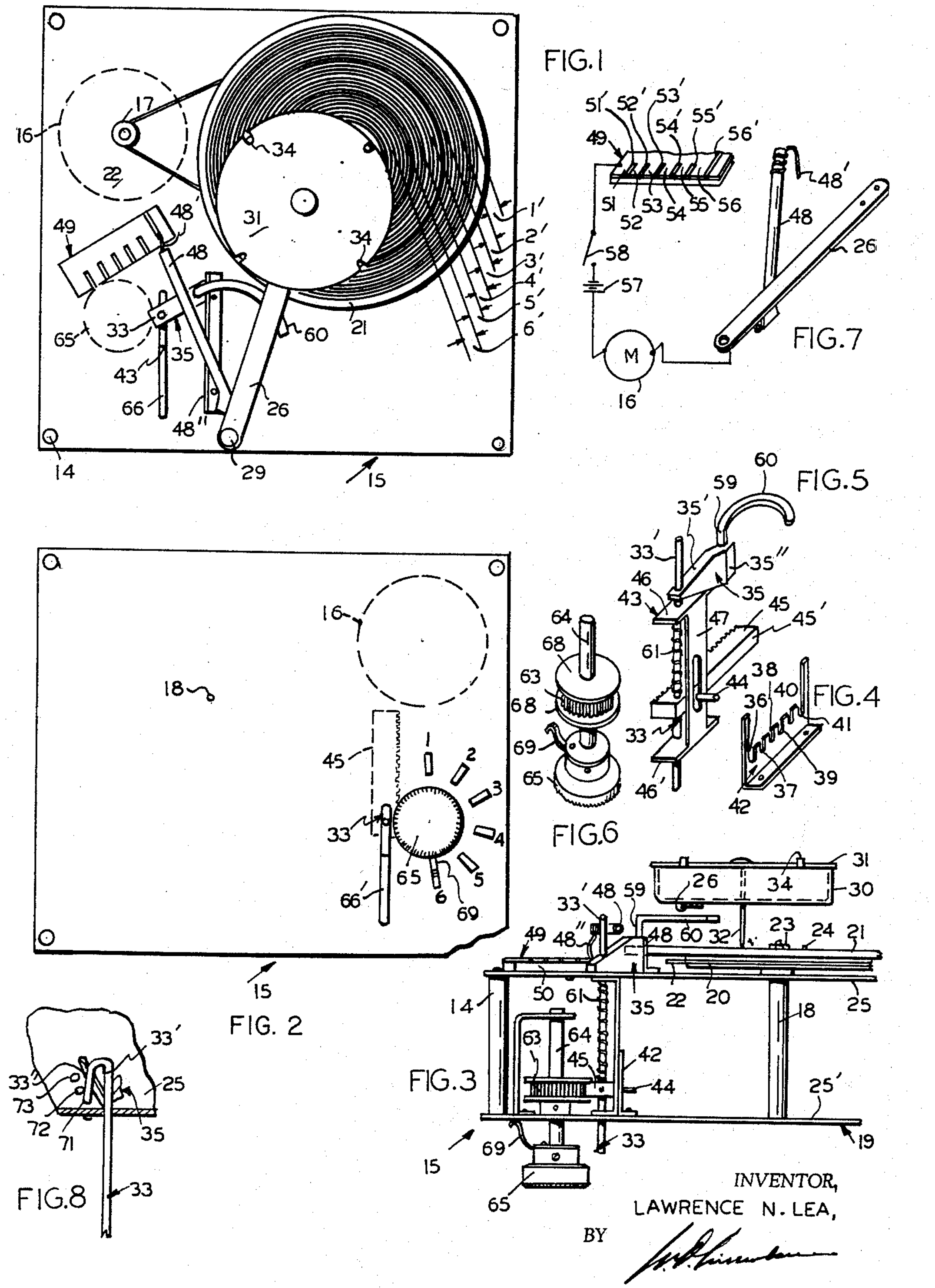
FIG. 1 is a top plan view of a phonograph apparatus embodying the teachings of this invention. Here, the stylus is at the end of the record.
FIG. 2 is a bottom view thereof.
FIG. 3 is a fragmentary front elevation of FIG. 1.
FIG. 4 is a perspective view of the notched selector plate.
FIG. 5 is a perspective view showing an assembly of parts associated with the long pin aforementioned. It includes the notch engagement pin, the cam and the arm which lifts the pick-up arm off the record.

FIG. 6 shows the one-point-control turn-and-push knob which I prefer to include. Of course, this knob is shown with its associated components. Without these, said long pin is the one-point control member. This view is also in perspective.

FIG. 7 is a perspective view showing the pick-up arm with its associated finger and the rest of the switch mechanism for the control of the motor, whose circuit is here shown diagrammatically.

FIG. 8 is a fragmentary perspective view showing a modified constructon where spaced holes serve as the selector means in conjunction with the long pin which latter may be termed the operator member; said holes being through a frame plate along the track for moving said operator member laterally.

In the drawing, the numeral 15 designates generally a phonograph apparatus including an electric motor 16 whose shaft is fitted with a comparatively small pulley 17. A shaft 18, journalled on the frame denoted generally by the numeral 19, carries a comparatively large pulley 20 which supports the record indicated generally by the numeral 21. An endless belt 22 connects said pulleys which are in proper ratio to give the shaft 18 the proper speed at which said record shall rotate. The record is preferably held fast on the pulley 20 which as here shown, is by the nut 23 on the threaded end of said shaft and the off-center pin 24 extending from the pulley 20 through a suitable hole in the record. The frame comprises the

2 upper and lower sheet metal plates 25, 25', held apart by the spacers 14.

The pick-up arm designated generally by the numeral 26, comprises a thin springy strip pivotally mounted on the frame at 29 at one of its ends and at its other end, said strip is suitably secured or welded to a metal cup 30 having a diaphragm 31 from which extends a stylus 32. The diaphragm is held as a cover for said cup 30 by means of the bent tabs 34 which extend upwardly from the rim of the cup. The stylus 32 extends through the cup, through a hole in the cup's bottom and thence with its point into a sound groove on the record 21. The stylus is of course fixed to said diaphragm 31 and such assembly serves when the record is rotating, to translate the resulting vibrations of the stylus 32 as determined by the sound groove 21', into sound, which is well known.

Until the turnable assembly shown in FIG. 6 is discussed, the elongated pin 33 is the operating control member of the apparatus 15. This pin extends through the aligned elongated slots 66, 66' in the respective plates, which serve as a track for lateral movement of such pin. Said pin is through said slots at all times and is also slidable longitudinally, to lift and lower the cam 35 which it carries near the periphery of the record 21, as well as to lift and lower the short selector pin 44, out of and into any of the notches 36 to 41 of the selector plate 42. There is a channel piece denoted generally by the numeral 43 which serves as a slide bearing means for the pin 33 and as its carrier along the track slots 66, 66'. The selector plate 42 is mounted to the frame plate 25' along said slots and its said notches are for engagement with the short pin 44 which is carried laterally from the pin 33. Said pin 44 may extend from a collar secured on pin 33, which collar, in the embodiment shown, is the rack piece 45. Since it is necessary to maintain the pin 33 from rotation in any direction, I provide in the embodiment illustrated, that the carrier 43 have its end walls 46, 46' in surface contact with the inner surfaces of the frame plates respectively, that the collar 45 shall have a flat surface 45' in contact with the middle wall 47 of the carrier 43 and that the cam 35 shall have a flat surface 35'' in contact with a fixed wall 48'' and as well, said carrier shall be in surface contact with the selector plate 42. The general plane of the track slots 66, 66' is parallel to all vertical surfaces which are in contact.

The cam 35 is wedge-shaped, normally stands on the outer surface of the frame plate 25 and presents its inclined surface 35' under the finger 48 which is a tubular piece extending angular-laterally from the pick-up arm 26. This finger extends to a metal comb 49 which is mounted on the frame, but insulated therefrom by the dielectric 50. A wire cat-whisker 48' extending from said finger, contacts the comb for movement across its teeth which serve as the contact points 51—56. Dielectric material is filled in between said comb teeth to present a smooth surface for the wire 48' which moves across them. These dielectric inlays are of a width a bit more than the thickness of said wire piece. Said finger 48 is of metal and with the comb plate 49, forms a switch in the circuit of the motor 16, which circuit is powered by dry cells 57 and may include a manually-operated switch 58 which is closed when the phonograph is to be used and opened when the device is to be put away. The dry cells may be held between the frame plates 25, 25' in suitable brackets which effect their connection in the motor circuit, as is well known in electrical devices and hence not shown.

At the top of the incline 35' of the cam 35, there is a post 59 from which there extends laterally, the arm 60 which is always under the springy pick-up arm 26. When the pin 33 is raised, the pin 44 leaves the notch it was in in the selector plate 42, the arcual arm 60 moves the pick-up arm 26 off the record 21, the spring 61 is further compressed, the finger 48 is of course lifted off the comb 49, but the action of the cam's incline 35' is to shift said finger in a direction away from the ending of the record 21 until it comes to rest against the upper part 33' of the pin 33.

It is to be noted that when the pin 44 is in the notch 36 and the finger 48 is against the pin part 33', the stylus 32 engages the record 21 at the starting point of the first lane 1' of the record's sound groove and the catwhisker contact brush 48' is at the starting edge of the contact segment 51, when the pin 33 is let free so that the cam 35 rests on the frame plate 25. The other notches of the selector plate 42, determine corresponding conditions respectively for the stylus and contact brush in relation to the other record lane starting points. Hence, for each lane on the record 21 there is a related contact segment on the member 49 and notch in member 42. For convenience, I have made the width of each of the record lanes equal. Therefore, the notches 36—41 are equispaced and the width of the contact segments 51—56 are equal.

It is also to be noted that the pin 33 is moved longitudinally to free the pin 44 from any notch in the selector plate 42, and then upon lateral movement of said pin 33 along the track slots 66, 66', when of course, the stylus 32 is off the record 21 and the contact brush 48' is off the comb plate 49, the finger 48 will come in contact with either the pin part 33' or the post 59 and be shifted thereby. Now, upon release of the pin 33 as it is set into a notch in the selector plate 42, the action of the cam 35 when off the frame, brings the finger 48 against the pin part 33' and is in position at the starting edge of the related contact segment and the stylus is at the start of the related record lane.

This phonograph apparatus 15 which is for playing one record lane at one setting, is preferably in the condition shown in FIG. 1, when it is to be put away. Here, the stylus 32 is at the end of the record 21, meaning at the end of record lane 6' and the tip of the brush 48' is engaged preferably in the groove 56' which is in dielectric member 50 at the end of the contact element 56. Such engagement is provided to avoid accidental movement of the stylus across the record when the device is not in use or when in shipment. To attain such position, the pin 44 is in the notch 41 and either the lane 6' has been played for the stylus to have reached the end of the record, or upon manipulation of the pin 33 so that pin 44 enters said notch 41, but before actually entering said notch, the operator shall move the pick-up arm 26 while it is in shifted away position from the record 21, towards the record's end, and set the brush 48' in said groove 56' by releasing the pin 33. If the switch 58 is included, it should now be opened. When the device 15 is to be used, said switch is of course closed and remains closed during the entire time of use.

To play any chosen lane of the record 21, the pin 33 is moved longitudinally for the pin 44 to be cleared for movement into the notch in plate 42 which corresponds to the lane chosen for play and said pin 33 is then moved laterally to the required notch and let go, for pin 44 to enter such notch. Such manipulation will have moved the pick-up arm 26 and the finger 48, so that the stylus will be set in the beginning of the record lane chosen and the brush 48' will contact the starting edge of the contact element on 49. The motor circuit is closed thereby and the motor will run and of course the record will be turned and the device will play.

The playing will continue until the brush 48' is off the contact element it was associated with, meaning the one it just wiped across, and will be on an insulated division between contact elements on 49, whereupon the motor circuit will be open and hence the motor will stop. At this time, the stylus 32 will be at the end of the record lane just played. Now the pin 33 can be shifted to bring the pin 44 into any other notch and thus play the record lane which is related thereto, or the last lane played can be replayed by merely shifting the pin 33 longitudinally and then let go so that the cam 35 will bring the pick-up arm and the finger to start position for such lane.

It is desirable that the device 15 shall be set by the turning of a knob rather than the lateral shifting by the operator of the pin 33 and that the knob be pushed to attain the required longitudinal movement of said pin 33. For such purpose, I have provided what is shown in FIG. 6 and what was before the collar 45, I now have the piece of rack which is in constant engagement with the spur gear 63 on the journalled shaft 64 which carries the operating knob 65, exterior the framework so it is readily accessible. Said gear 63 is between the flanges 68 secured thereto, and of course said gear is fast on said shaft 64, which when turned, will cause the pin 33 to move laterally along the track slots 66, 66', and when said knob is pushed to stress the spring 61, said pin 33 will be shifted longitudinally to have the pin 44 clear the notches in the selector plate 42.

It is to be noted that the knob 65 can be turned and, only if it is pressed and held to maintain the pin 44 out of the notched selector plate 42. While the knob is so held, it is turned to bring the pin 44 to the notch it is to enter which occurs when said knob is released, for the spring 61 will restore rest condition. Also to be noted is the resilient bowed detent 69 carried by the shaft 64 for releasable engagement successively in the equi-spaced dents numbered 1–6 arranged radially about said shaft's axis and elongated to accommodate the movement of the detent when the knob 65 is pressed on. These dents determine the positioning of the pin 44 in the various notches of the selector plate 42, and are numbered to correspond to the lane to be played.

So, to operate the device 15, that is, to set it for the playing of a chosen lane on the record, push the knob 65 and then turn it until the detent 69 is in the dent required. Now, let go of the knob, whereupon the action of the cam 35 will bring the stylus 32 to the start of the chosen record lane and the brush 48' to the start of the related contact segment and the device will play the matter of the chosen lane. At the end of the lane, the brush will come onto dielectric material, the motor circuit will thus open and the apparatus will be at rest, ready for another manual manipulation to start another performance.

Each line across in the following table shows the group of elements which cooperate at the various settings.

| For playing record lane | Detent 69 in dent | Pin 44 in notch | Brush 48 on contact | Play stops when brush 48' on dielectric |
|---|---|---|---|---|
| 1' | 1 | 36 | 51 | 51' |
| 2' | 2 | 37 | 52 | 52' |
| 3' | 3 | 38 | 53 | 53' |
| 4' | 4 | 39 | 54 | 54' |
| 5' | 5 | 40 | 55 | 55' |
| 6' | 6 | 41 | 56 | 56' |

In FIG. 8, I show another form of selector means by having the operator member as the pin 33 may be called, with a hook form so that pin part 33" can be set to engage in any of the spaced holes which are in proper relation along the track 66 in the frame plate 25. This takes the place of the pin 44 and the notched selector plate 42. The spacing of the series of holes of which 71, 72, 73 appear in FIG. 8, is the same as the spacing of the notches in the plate 42.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description and showing herein to indicate the scope of this invention.

I claim:

1. In a phonograph apparatus, a frame, a phonograph record revolvably mounted on the frame, an electric motor with means arranged to turn said record when said motor is actuated, a pick-up arm comprising a springy strip element swingably mounted at one of its ends on the frame, for movement across the record and a means including a stylus associated with a diaphragm at the other end of said strip element, adapted when the record is turning and said stylus is in contact with a sound groove on the record, to translate vibrations of the stylus into sound; said strip element being biased so that said stylus normally contacts the record, an electrical switch mechanism including a dielectric member fixed on the frame, carrying a predetermined number of conductive elements in spaced relation thereon, conductive means connecting said contact elements and constituting one terminal of said switch mechanism, a conductive finger constituting the other terminal of said switch mechanism, extending from said strip element; said finger being adapted for wiping contact with one of said contact elements at one time at any position the stylus may be on the record before it reaches the end of the record and as said pick-up arm moves to bring the stylus towards the end of the record, to traverse said one element, an elongated operator member positioned substantially parallel to the axis of swing of said pick-up arm; said operator member being mounted for lateral movement along a definite path on the frame, an element extending from said operator member so that part of said element is spaced from and along said operator member; said finger being between said operator member and said element part so that upon movement of said operator member along said path, the finger will be moved to cause the pick-up arm to swing, means to releasably hold said operator member at predetermined positions along said path; said positions being so spaced that when said operator member is at any one of them and said finger is in contact with said operator member, said finger will contact a particular one of said contact elements respectively; said operator member being capable of longitudinal movement, cam means on said operator member, adapted upon longitudinal movement of said operator member in one direction, to bend said springy element so that the stylus leaves the face of the record and to set said finger into contact with said operator member; said finger being movable between said operator member and the mentioned element part; the space between said operator member and said element part being such that upon movement in said space from contact position with one to contact position with the other, said finger will traverse one contact element, and a circuit for actuating said motor, including said switch mechanism to control motor operation.

2. A phonograph apparatus as defined in claim 1, wherein the means to releasably hold the operator member at positions along the said path, consists of a second element extending from the operator member; the frame being provided with spaced openings along said path; said second element being entered and fitting in one of said openings when the stylus contacts the record; said second element being shifted out of said opening when the operator member is shifted longitudinally in said one direction.

3. A phonograph apparatus as defined in claim 1, wherein the means to releasably hold the operator member at positions along said path, consists of a second element extending laterally from said operator member, an element on the frame being provided with spaced notches along said path; said second element being entered and fitting in one of said notches when the stylus contacts the record; said second element being shifted out of said notch when the operator member is shifted longitudinally in said one direction.

4. A phonograph apparatus as defined in claim 1, including spring means biasing said operator member to normally hold it longitudinally in a position where the stylus is in contact with the record.

5. An apparatus as defined in claim 1, wherein the lateral path along which the operator member moves on the frame is straight; said apparatus including means maintaining said operator member against rotating about its own length, a turnable member on the frame, means associating said turnable member and said operator member whereby on turning said turnable member, the operator member will move along its path on the frame and upon longitudinal movement of said operator member, said turnable member will move along with said operator member.

6. An apparatus as defined in claim 1, wherein the lateral path along which the operator member moves on the frame is straight; said apparatus including a rack carried on said operator member and extending along said track, a shaft having a gear fixed thereon, rotatably mounted on the frame and capable of longitudinal movement; the longitudinal directions of said operator member and shaft being parallel and said gear and rack being in meshed engagement and flanges, one on each face of said gear and forming a channel therewith; said rack being slidably fitted in said channel, whereby on longitudinal movement of said operator member, said shaft will move longitudinally.

7. An apparatus as defined in claim 6, including a springy detent extending from the shaft and onto the frame; the frame being provided with dents in the locus of movement of said detent; said dents being so spaced that the detent is in one of them when the operator member is at one of its stations respectively.

8. In a phonograph apparatus, a frame, a phonograph record revolvably mounted on the frame, an electric motor with means arranged to turn said record when said motor is actuated, a pick-up arm comprising a springy strip element swingably mounted at one of its ends on the frame, for movement across the record and a means including a stylus associated with a diaphragm at the other end of said strip element, adapted when the record is turning and said stylus is in contact with a sound groove on the record, to translate vibrations of the stylus into sound; said strip element being biased so that said stylus normally contacts the record, an electrical switch mechanism including a dielectric member fixed on the frame, carrying a predetermined number of electrically conductive contact elements in spaced relation thereon, conductive means connecting said contact elements and constituting one terminal of said switch mechanism, an electrically conductive finger constituting the other terminal of said switch mechanism, extending from said strip element; said finger being adapted for wiping contact with one of said contact elements at one time at any position of the stylus may be on the record before it reaches the end of the record and as such pick-up arm moves to bring the stylus towards the end of the record, to traverse said one element, a first pin positioned substantially parallel to the axis of swing of said pick-up arm, a cam element fixed on said first pin intermediate the ends of said first pin; said cam presenting an inclined surface for contacting said finger and so positioned that when said first pin is moved longitudinally in one direction for said cam surface to contact said finger and push it, the springy strip element will move away from the record, whereupon the stylus will leave the record; said cam surface being in a direction across said finger and its inclination is such that when it contacts said finger and the finger is moved towards the end of the record, the distance of the stylus from the record is increased, a post fixed on said cam, extending substantially parallel to the first pin; said finger being between said first pin and post and capable of contact with each one of them respectively, an arm extending laterally from said post, adapted to move said springy strip element at any position of the latter, away from the record when said first pin is moved longitudinally to contact said finger, track means on the frame; said first pin being mounted for lateral movement along said track whereupon said finger is moved causing said strip element to be swung; said first pin being capable of longitudinal movement and said track means maintaining said first pin against axial rotation, means to fix said first pin at predetermined positions along said track; said positions being so spaced that when said first pin is at any of them and the finger is in contact with said first pin, said finger will contact a particular one of said contact elements respectively and a circuit for actuating said motor, including said switch mechanism to control motor operation.

9. A phonograph apparatus as defined in claim 8, wherein the means to releasably fix the first pin at positions along said track, consists of a second element extending from the said pin; the frame being provided with spaced openings along said track; said second element being entered and fitted in one of said openings when the stylus contacts the record; said second element being shifted out of said opening when said first pin is shifted longitudinally in said one direction.

10. A phonograph apparatus as defined in claim 8, wherein the means to releasably hold the first pin at positions along said track, consists of a second pin extending laterally from said first pin, an element on the frame being provided with spaced notches along said track; said second pin being entered and fitting in one of said notches when the stylus contacts the record; said second pin being shifted out of said notch when the said first pin is moved longitudinally in said one direction.

11. A phonograph apparatus as defined in claim 8, including spring means biasing said first pin to normally hold it longitudinally in a position where the stylus is in contact with the record.

12. A phonograph apparatus as defined in claim 1, wherein the dielectric member is provided with a groove next to that contact element which the finger traverses last to come to the end of the record; said finger being engaged in said groove when the stylus is at the end of the record.

13. A phonograph apparatus as defined in claim 1, including a switch connected in series with said switch mechanism.

References Cited in the file of this patent

UNITED STATES PATENTS 2,076,937 Cannon -------------- Apr. 13, 1937